United States Patent
Koskinen et al.

(10) Patent No.: US 11,844,021 B2
(45) Date of Patent: Dec. 12, 2023

(54) ENHANCED WAKE-UP SIGNAL HANDLING

(71) Applicant: Nokia Technologies Oy, Espoo (FI)

(72) Inventors: Jussi-Pekka Koskinen, Oulu (FI); Jarkko Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/277,172

(22) PCT Filed: Sep. 20, 2019

(86) PCT No.: PCT/IB2019/057959
§ 371 (c)(1),
(2) Date: Mar. 17, 2021

(87) PCT Pub. No.: WO2020/058920
PCT Pub. Date: Mar. 26, 2020

(65) Prior Publication Data
US 2021/0377865 A1    Dec. 2, 2021

Related U.S. Application Data

(60) Provisional application No. 62/734,716, filed on Sep. 21, 2018.

(51) Int. Cl.
*H04W 52/02* (2009.01)
*H04W 68/00* (2009.01)
*H04W 76/28* (2018.01)

(52) U.S. Cl.
CPC ..... *H04W 52/0235* (2013.01); *H04W 68/005* (2013.01); *H04W 76/28* (2018.02)

(58) Field of Classification Search
CPC .......... H04W 52/0235; H04W 68/005; H04W 76/28; Y02D 30/70
(Continued)

(56) References Cited

U.S. PATENT DOCUMENTS 7,660,281 B2 * 2/2010 Kim ..................... H04W 74/004
455/39
10,178,561 B2 * 1/2019 Hu ......................... H04W 88/06
(Continued)

FOREIGN PATENT DOCUMENTS

CN        1706208    * 12/2005    ............. H04W 60/04
CN      104284420    *  1/2015    ......... H04W 52/0209

OTHER PUBLICATIONS

"Define Relation between WUS Occasion and PO", 3GPP TSG-RAN WG2 Meeting #103, R2-1813078, Qualcomm Incorporated, Aug. 20-24, 2018, 3 pages.
(Continued)

*Primary Examiner* — Inder P Mehra
(74) *Attorney, Agent, or Firm* — SQUIRE PATTON BOGGS (US) LLP

(57) ABSTRACT

According to a first embodiment, a method may include receiving, by a user equipment, at least one indication that the user equipment is allowed to skip paging monitoring after a paging message is successfully decoded. The method may further include determining, by the user equipment, that the user equipment can end paging monitoring based upon received wake-up signaling configuration data. The method may further include entering, by the user equipment, an extended discontinuous reception sleep mode.

19 Claims, 4 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 2013/0044652 | A1* | 2/2013 | Wang | H04L 1/0072 370/280 |
| 2013/0064151 | A1* | 3/2013 | Mujtaba | H04B 7/0871 370/311 |
| 2014/0329550 | A1* | 11/2014 | Diachina | H04W 68/02 455/458 |
| 2014/0362752 | A1* | 12/2014 | Jha | H04L 67/16 370/311 |
| 2018/0270756 | A1* | 9/2018 | Bhattad | H04W 76/27 |
| 2019/0090191 | A1* | 3/2019 | Liu | H04W 52/0235 |
| 2019/0306737 | A1* | 10/2019 | Kwak | H04L 5/0053 |
| 2019/0320490 | A1* | 10/2019 | Liu | H04W 72/1289 |
| 2021/0112495 | A1* | 4/2021 | Liang | H04W 52/0235 |
| 2021/0168759 | A1* | 6/2021 | Pan | H04W 68/02 |

OTHER PUBLICATIONS

"3rd Generation Partnership Project; Technical Specification Group Radio Access Network; Evolved Universal Ter-restrial Radio Access (E-UTRA); User Equipment (UE) procedures in idle mode (Release 15)", 3GPP TS 36.304, V15.0.0, Jun. 2018, pp. 1-52.

"3rd Generation Partnership Project; Technical Specification Group Radio Access Network; Evolved Universal Terrestrial Radio Access (E-UTRA); Physical channels and modulation (Release 15)", 3GPP TS 36.211, V15.2.0, Jun. 2018, pp. 1-236.

"3rd Generation Partnership Project; Technical Specification Group Radio Access Network; Evolved Universal Terrestrial Radio Access (E-UTRA); Physical layer procedures (Release 15)", 3GPP TS 36.213, V15.2.0, Jun. 2018, pp. 1-541.

International Search Report and Written Opinion received for corresponding Patent Cooperation Treaty Application No. PCT/IB2019/057959, dated Nov. 28, 2019, 16 pages.

"Introduction of Further NB-IoT Enhancements in 36.304", 3GPP TSG-RAN WG2 Meeting #102, R2-1808845, Nokia, May 21-25, 2018, 2 pages.

"Introduction of Further eMTC Enhancements in 36.304", 3GPP TSG-RAN WG2 #102, R2-1809254, Nokia, May 21-25, 2018, 10 pages.

"WUS Time Configuration", 3GPP TSG-RAN WG2 Meeting #102, R2-1807744, Agenda : 9.13.9, MediaTek Inc., May 21-25, 2018, pp. 1-5.

"Wake Up Signal", 3GPP TSG-RAN2 Meeting #102, R2-1807773, Agenda : 9.13.9, Ericsson, May 21-25, 2018, pp. 1-6.

"Wake-up Signal Configurations and Procedures", 3GPP TSG RAN WG1 Meeting #93, R1-1806159, Agenda : 6.2.7.1.1.2, Nokia, May 21-25, 2018, 6 pages.

* cited by examiner

ENHANCED WAKE-UP SIGNAL HANDLING

RELATED APPLICATION

This application claims priority to PCT Application No. PCT/IB2019/057959, filed on Sep. 20, 2019, which claims priority to U.S. Application No. 62/734,716, filed on Sep. 21, 2018, each of which is incorporated herein by reference in its entirety.

BACKGROUND

Field

Certain embodiments may relate to wireless communication systems. For example, some embodiments may relate to wake-up signaling for example in enhanced discontinuous reception.

Description of the Related Art

User equipment may use wake-up signals to reduce power consumption when monitoring for paging occasions. For example, wake-up signals may be used to indicate that a user equipment should monitor at least one physical downlink control channel (PDCCH) for paging occasions after receiving a wake-up signal. When the user equipment detects a wake-up signal, the user equipment will continue to monitor PDCCH for N paging occasions, where N is an integer.

However, one of the challenges with current wake-up signaling techniques is that when user equipment using extended discontinuous reception (eDRX) detects a wake-up signal, the user equipment may monitor up to N paging occasions or until a paging message containing the non-access stratum (NAS) identity corresponding with the user equipment is received, whichever occurs first. As a result, the user equipment may needlessly monitor all N paging occasions after receiving the wake-up signal since paging message content, such as user equipment identity, in subsequent paging occasions may be identical. Such repetitive monitoring may increase battery consumption of the user equipment, as well as require additional, but wasteful, processing power.

BRIEF DESCRIPTION OF THE DRAWINGS

For proper understanding of this disclosure, reference should be made to the accompanying drawings, wherein.

DETAILED DESCRIPTION

Certain embodiments described herein may help to improve the management of wake-up signaling. Some example embodiments described herein may have various benefits and/or advantages. For example, some embodiments may minimize power consumption by reducing unnecessary paging monitoring and/or entering a reduced-power sleep mode. Furthermore, some example embodiments may allow user equipment to attempt to decode only a minimal number of paging messages. Certain embodiments are, therefore, directed to improvements in computer-related technology, specifically, by conserving network resources and reducing power consumption of network entities and/or user equipment located within the network.

Figure 1:
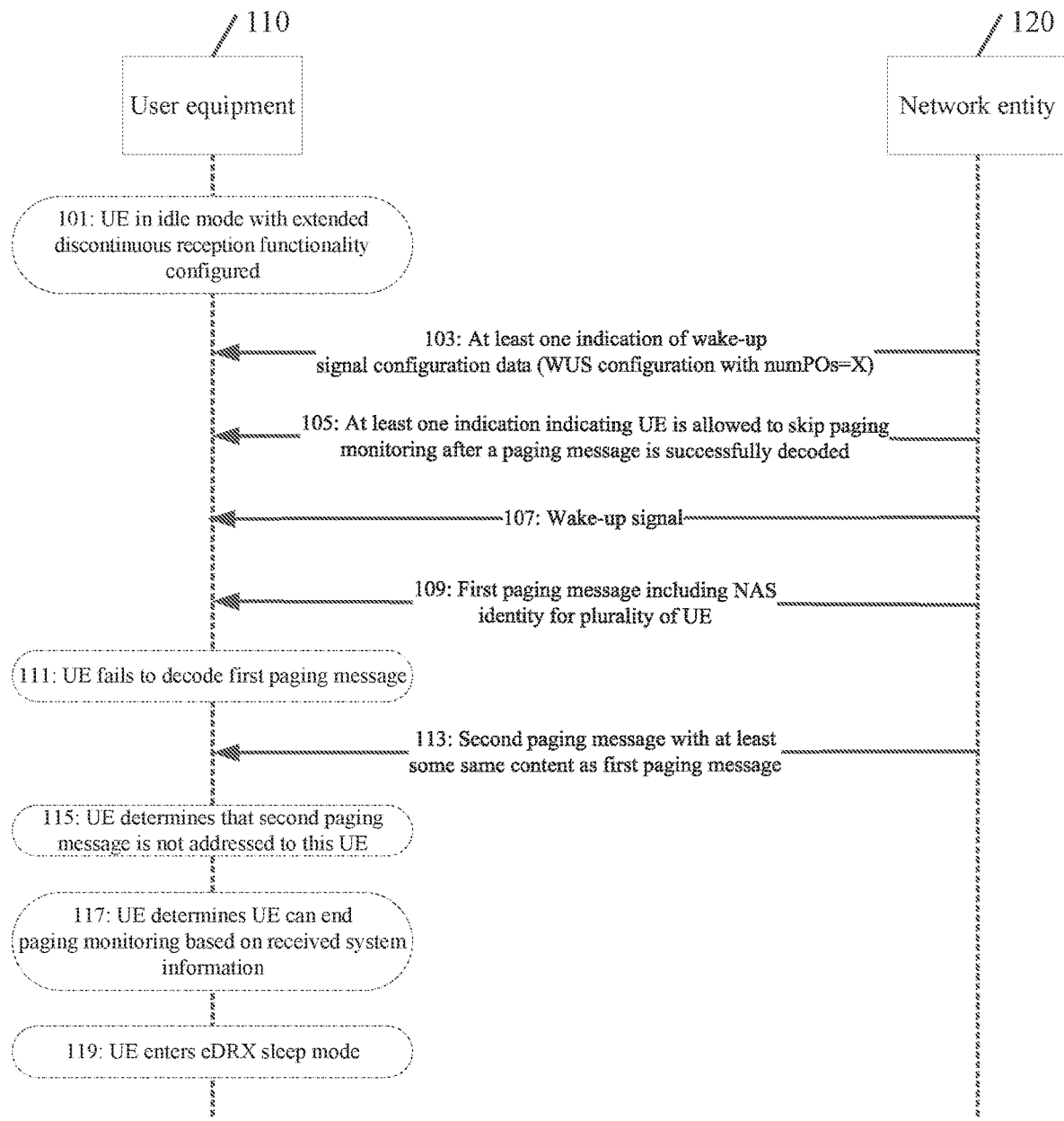
FIG. 1 illustrates a signaling diagram according to certain embodiments.

FIG. 1 illustrates an example of a signalling diagram according to some embodiments. User equipment (UE) 110 may be similar to UE 410 in FIG. 4, while network entity (NE) 120 may be similar to NE 420 in FIG. 4. Although only a single UE and NE are illustrated, a communications network may contain one or more of each of these entities. In step 101, UE 110 may be configured in an idle mode with discontinuous reception functionality, including an extended discontinuous reception functionality. In step 103, UE 110 may receive at least one indication comprising wake-up signal configuration data from NE 120. In some embodiments, the at least one indication comprising wake-up signal configuration data may be, for example, system information and/or information included in system information.

In step 105, UE 110 may receive at least one indication from NE 120 indicating UE 110 is allowed to skip paging monitoring after a paging message is successfully decoded. UE 110 may receive the at least one indication according to dedicated signaling and/or broadcast signaling. In some embodiments, the at least one indication indicating UE 110 is allowed to skip paging monitoring after a paging message is successfully decoded may be, for example, system information and/or information included in system information.

In some embodiments, UE 110 may receive at least one indication associated with whether UE 110 is allowed to skip paging monitoring after a paging message is successfully decoded. For example, the at least one indication may indicate whether UE 110 is or is not required to continue monitoring for additional paging occasions after receiving a first paging occasion.

In various embodiments, UE 110 may receive at least one indication that all paging occasions received after receiving at least one wake-up signal may contain the same paging message. For example, after receiving a wake-up signal, the at least one indication may indicate whether some or all paging occasions will contain paging data for UE 110 after receiving a first paging message. Furthermore, UE 110 may assume that a first paging message and subsequent paging messages will contain the same data, such as earthquake and tsunami warning system (ETWS)/commercial mobile alert system (CMAS) indications. In addition, if UE 110 receives a first paging occasion without the user equipment identity and/or other information, subsequent paging occasions may not change any information, allowing UE 110 to cease monitoring of subsequent paging occasions.

In some embodiments, UE 110 may receive at least one indication that all paging occasions will contain the same identical user equipment identities following at least one wake-up signal. In some embodiments, the at least one indication may include at least one configuration, information, and/or signaling. For example, the at least one indication may configure UE 110 to know whether any subsequent paging occasions will contain paging for UE 110, after receiving at least one wake-up signal. Thus, if UE 110 receives a first paging occasion which does not contain the user equipment identity associated with UE 110, subsequent paging occasions will not contain the user equipment identity associated with UE 110, and UE 110 may cease monitoring for additional paging occasions. However, additional information in subsequent paging occasions may change.

In step 107, UE 110 may receive at least one wake-up signal from NE 120. In step 109, UE 110 may receive a first paging message from NE 120 comprising at least one non-access stratum (NAS) identity for a plurality of user equipment, including UE 110. In step 111, UE 110 may determine that the first paging message cannot be decoded. In step 113, UE 110 may receive a second paging message from NE 120 comprising at least some same data as the first paging message. In step 115, UE 110 may determine that the second paging message is not addressed to UE 110.

In step 117, UE 110 may determine that UE 110 can cease paging monitoring based upon the wake-up signal configuration data received from NE 120. In step 119, UE 110 may enter a discontinuous reception sleep mode, including an extended discontinuous reception sleep mode, which may comprise reduced power consumption of UE 110.

Figure 2:
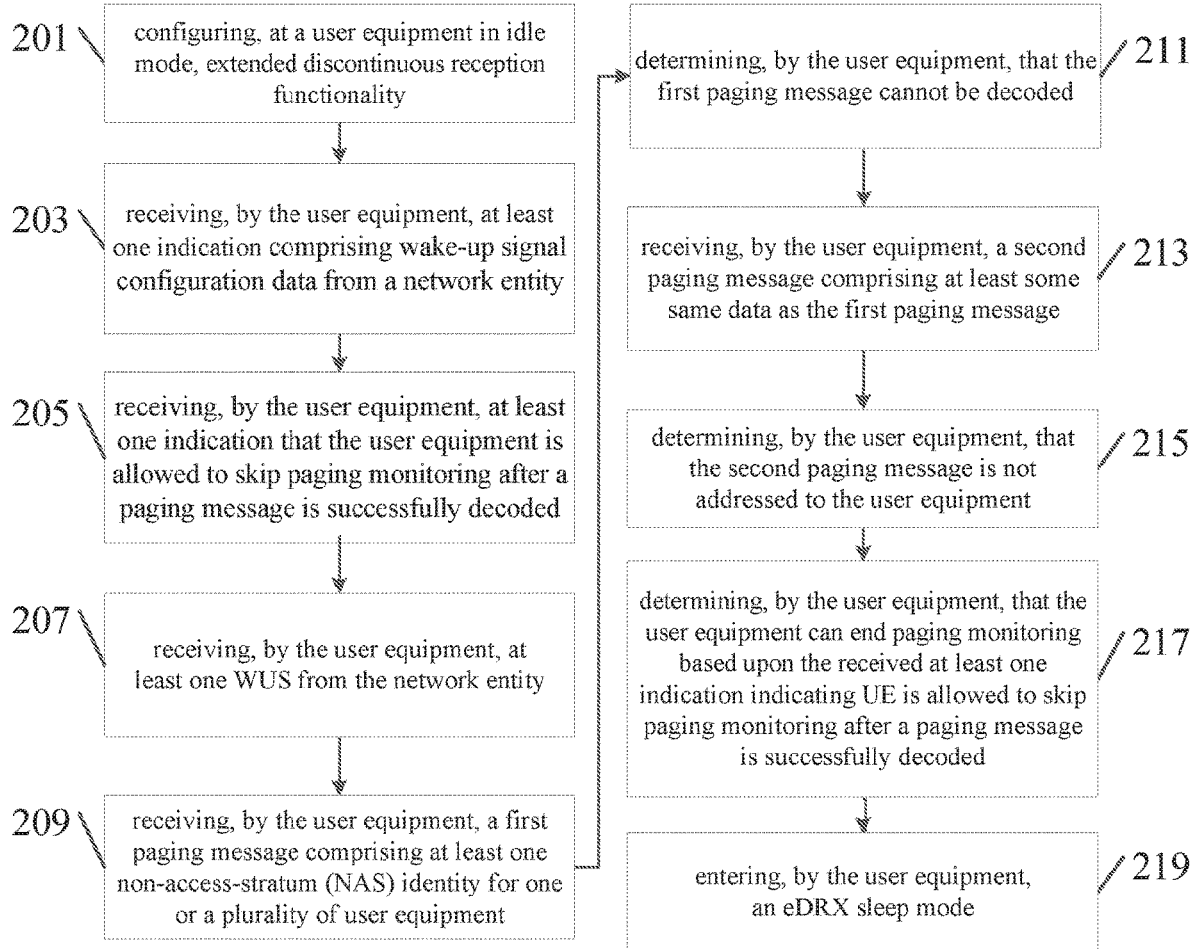
FIG. 2 illustrates an example of a method performed by a user equipment according to certain embodiments.
Figure 4:
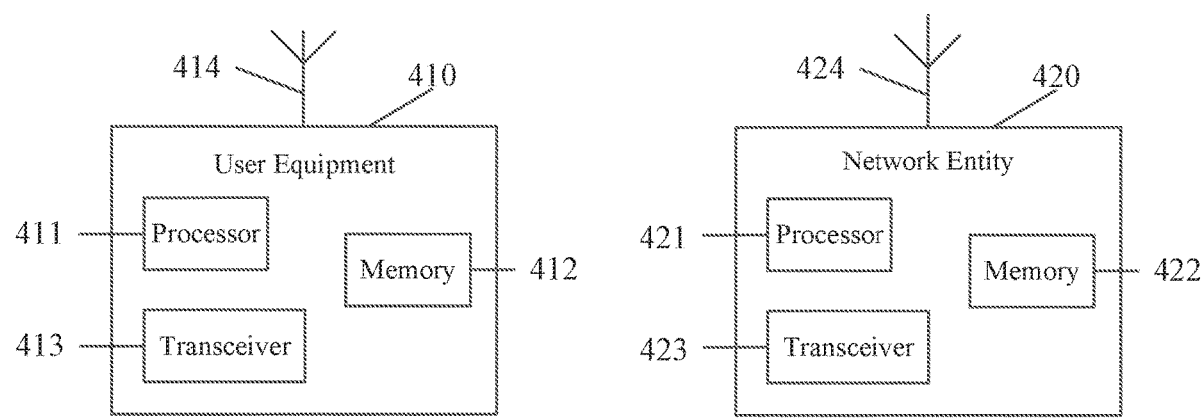
FIG. 4 illustrates an example of a system according to certain embodiments.

FIG. 2 illustrates an example of a method performed by a user equipment, for example, user equipment 410 in FIG. 4. In step 201, the user equipment may be configured in an idle mode with discontinuous reception functionality, including extended discontinuous reception functionality. In step 203, the user equipment may receive at least one indication comprising wake-up signal configuration data from a network entity, for example, network entity 420 in FIG. 4. In some embodiments, the at least one indication comprising wake-up signal configuration data may be, for example, system information and/or information included in system information.

In step 205, the user equipment may receive at least one indication that the user equipment is allowed to skip paging monitoring after a paging message is successfully decoded, where the user equipment may receive the at least one indication according to dedicated signaling and/or broadcast signaling. In some embodiments, the at least one indication indicating the user equipment is allowed to skip paging monitoring after a paging message is successfully decoded may be, for example, system information and/or information included in system information.

In some embodiments, the user equipment may receive at least one indication associated with whether the user equipment is allowed to skip paging monitoring after a paging message is successfully decoded. For example, the at least one indication may indicate whether the user equipment is or is not required to continue monitoring for additional paging occasions after receiving a first paging occasion.

In various embodiments, the user equipment may receive at least one indication that all paging occasions received after receiving a wake-up signal contain the same paging message. For example, after receiving a wake-up signal, the at least one indication may indicate whether all paging occasions will contain paging data for the user equipment after receiving a first paging message. Furthermore, the user equipment may assume that the first paging message and subsequent paging messages will contain the same data, such as ETWS/CMAS indications. In addition, if the user equipment receives a first paging occasion without the user equipment identity and/or other information, subsequent paging occasions may not change any information, allowing the user equipment to cease monitoring for subsequent paging occasions.

In some embodiments, the user equipment may receive at least one indication that all paging occasions will contain the same identical user equipment identities following at least one wake-up signal. For example, the at least one indication may configure the user equipment to know whether any subsequent paging occasions will contain paging for the user equipment, after receiving at least one wake-up signal. Thus, if the user equipment receives a first paging occasion without the user equipment identity, subsequent paging occasions will not contain the user equipment identity, and the user equipment may cease monitoring for additional paging occasions. However, additional information in subsequent paging occasions may change.

In step 207, the user equipment may receive at least one wake-up signal from the network entity. In step 209, the user equipment may receive a first paging message comprising at least one non-access-stratum identity for a plurality of user equipment, including the user equipment. In step 211, the user equipment may determine that the first paging message cannot be decoded. In step 213, the user equipment may receive a second paging message comprising at least some same data as the first paging message. In step 215, the user equipment may determine that the second paging message is not addressed to the user equipment.

In step 217, the user equipment may determine that the user equipment can end paging monitoring based on the wake-up signal configuration data received from the network entity. In step 219, the user equipment may enter a discontinuous reception sleep mode, including an extended discontinuous reception sleep mode.

Figure 3:
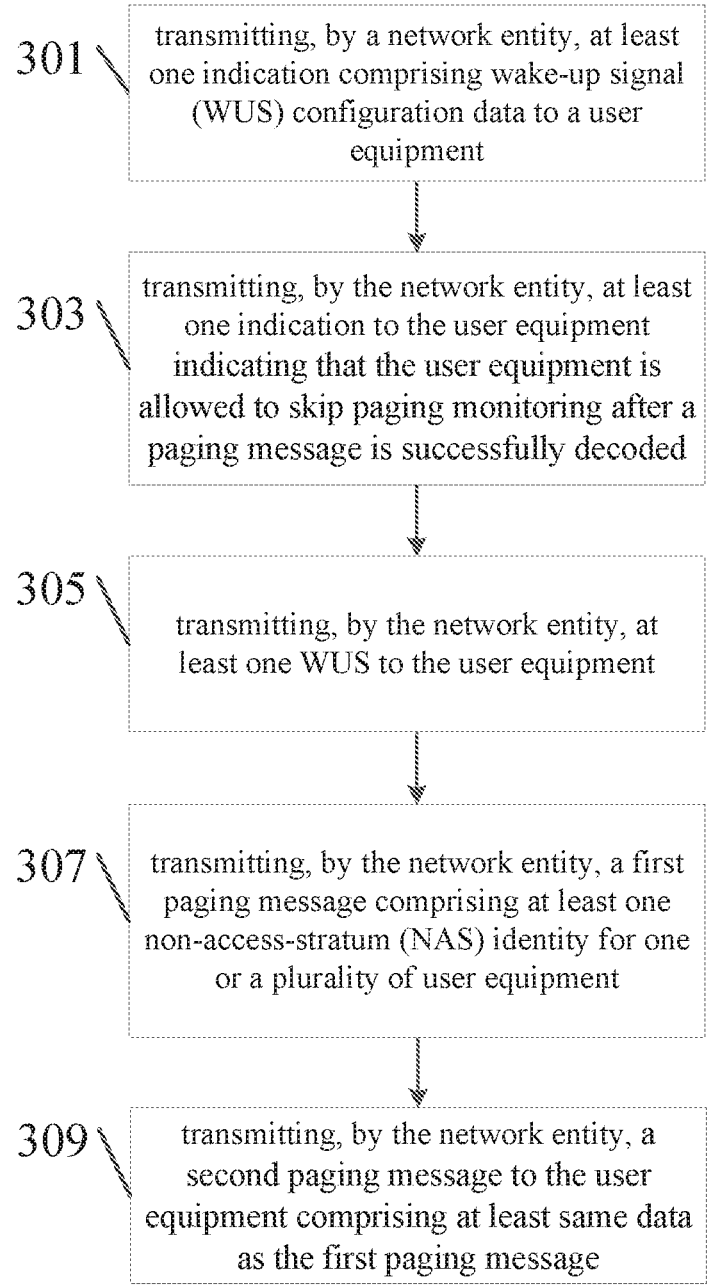
FIG. 3 illustrates an example of a method performed by a network entity according to certain embodiments.

FIG. 3 illustrates an example of a method performed by a network entity, for example, network entity 420 in FIG. 4. In step 301, the network entity may transmit at least one indication comprising wake-up signal configuration data to a user equipment, for example, user equipment 410 in FIG. 4. In some embodiments, the at least one indication comprising wake-up signal configuration data may be, for example, system information and/or information included in system information.

In step 303, the network entity may transmit at least one indication to the user equipment indicating that the user equipment is allowed to skip paging monitoring after a paging message is successfully decoded, where the user equipment may receive the at least one indication according to dedicated signaling and/or broadcast signaling. In some embodiments, the at least one indication indicating the user equipment is allowed to skip paging monitoring after a paging message is successfully decoded may be, for example, system information and/or information included in system information.

In some embodiments, the network entity may transmit at least one indication associated with whether the user equipment is allowed to skip paging monitoring after a paging message is successfully decoded. For example, the at least one indication may indicate whether the user equipment is or is not required to continue monitoring for additional paging occasions after receiving a first paging occasion.

In various embodiments, the network entity may transmit at least one indication that all paging occasions received after receiving a wake-up signal contain the same paging message. For example, after receiving a wake-up signal, the at least one indication may indicate whether all paging occasions will contain paging data for the user equipment after receiving a first paging message. Furthermore, the user equipment may assume that the first paging message and subsequent paging messages will contain the same data, such as ETWS/CMAS indications. In addition, if the network entity transmits a first paging occasion without the user equipment identity and/or other information, subsequent paging occasions may not change any information, allowing the user equipment to cease monitoring for subsequent paging occasions.

In some embodiments, the network entity may transmit at least one indication that all paging occasions will contain the same identical user equipment identities following at least one wake-up signal. For example, the at least one indication may configure the user equipment to know whether any subsequent paging occasions will contain paging for the user equipment, after receiving at least one wake-up signal. Thus, if the network entity transmits a first paging occasion without the user equipment identity, subsequent paging occasions will not contain the user equipment identity, and the user equipment may cease monitoring for additional paging occasions. However, additional information in subsequent paging occasions may change.

In step 305, the network entity may transmit at least one wake-up signal to the user equipment. In step 307, the network entity may transmit a first paging message comprising at least one non-access-stratum identity for a plurality of user equipment, including the user equipment, to the user equipment. In step 309, the network entity may transmit a second paging message to the user equipment comprising at least some same data as the first paging message.

FIG. 4 illustrates an example of a system according to certain embodiments. In one embodiment, a system may include multiple devices, such as, for example, user equipment 410 and network entity 420. User equipment 410 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 420 may be one or more of a base station, such as an evolved node B (eNB) or next generation node B (gNB), a next generation radio access network (NG RAN), a serving gateway, a server, and/or any other access node or combination thereof.

One or more of these devices may include at least one processor, respectively indicated as 411 and 421. At least one memory may be provided in one or more of devices indicated at 412 and 422. The memory may be fixed or removable. The memory may include computer program instructions or computer code contained therein. Processors 411 and 421 and memory 412 and 422 or a subset thereof, may be configured to provide means corresponding to the various blocks of FIGS. 1-3. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 4, transceivers 413 and 423 may be provided, and one or more devices may also include at least one antenna, respectively illustrated as 414 and 424. The device may have many antennas, such as an array of antennas configured for multiple input multiple output (MIMO) communications, or multiple antennas for multiple radio access technologies. Other configurations of these devices, for example, may be provided.

Transceivers 413 and 423 may be a transmitter, a receiver, or both a transmitter and a receiver, or a unit or device that may be configured both for transmission and reception.

Processors 411 and 421 may be embodied by any computational or data processing device, such as a central processing unit (CPU), application specific integrated circuit (ASIC), or comparable device. The processors may be implemented as a single controller, or a plurality of controllers or processors.

Memory 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-3). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-3. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
4G 4th Generation Mobile Network
5G 5th Generation Mobile Network
CMAS Commercial Mobile Alert System
DL Downlink
eDRX Extended Discontinuous Reception
eNB evolved Node B base station
ETWS Earthquake and Tsunami Warning System
NAS Non-Access Stratum
NB Narrow Band
NE Network Entity
PDCCH Physical Downlink Control Channel
PO Paging Occasion
UE User Equipment
WUS Wake-Up Signal According to a first embodiment, a method may include receiving, by a user equipment, at least one indication that the user equipment is allowed to skip paging monitoring after a paging message is successfully decoded. The method may further include determining, by the user equipment, that the user equipment can end paging monitoring based upon received wake-up signaling configuration data. The method may further include entering, by the user equipment, an extended discontinuous reception sleep mode.

In a variant, the at least one indication may be received as part of broadcasted signaling, for example system information.

In a variant, the at least one indication may be received as part of dedicated signaling, including at least one radio resource control message.

In a further variant, the at least one radio resource control message may comprise one or more of at least one radio resource control reconfiguration, radio resource control setup, radio resource control resume, and radio resource control re-establishment.

In a variant, the method may further include receiving, by the user equipment, at least one indication that paging occasion received after receiving at least one wake-up signal may contain the same paging messages.

In a variant, the same paging messages may be identical.

In a variant, the method may further include, after receiving a wake-up signal, receiving, by the user equipment, at least one indication indicating whether at least one paging occasion may contain paging data for the user equipment after receiving a first paging message.

In a variant, the paging data may comprise user equipment identifier.

In a variant, the method may further include receiving, by the user equipment, at least one indication that at least one paging occasion may contain the same user equipment identities following at least one wake-up signal.

In a variant, the user equipment may receive an indication of a number of paging messages for the user equipment to successfully decode from the network entity.

In a further variant, the user equipment may decode a number of paging messages equal to the indication of a number of paging message.

In a further variant, the user equipment may enter a sleep mode when the at least one paging message does not include the user equipment non-access stratum identity and/or when the number of paging messages successfully received equals the indication of a number of paging messages.

In a variant, the method may include receiving, by the user equipment, at least one indication configuring the user equipment to know whether any subsequent paging occasions may contain paging for the user equipment, after receiving at least one wake-up signal.

In a variant, the user equipment may be configured in an idle mode

In a variant, the user equipment may be configured in an inactive mode.

In a variant, the user equipment may be configured in a connected mode.

In a further variant, the user equipment may be configured with an extended discontinuous reception functionality.

In a variant, the method may further include receiving, by the user equipment, at least one indication comprising wake-up signal configuration data from the network entity.

In a variant, the method may further include receiving, by the user equipment, at least one wake-up signal from the network entity.

In a variant, the method may further include receiving, by the user equipment, a first paging message comprising at least one non-access-stratum identity for a plurality of user equipment.

In a variant, the method may further include determining, by the user equipment, that the first paging message cannot be decoded.

In a variant, the method may further include receiving, by the user equipment, a second paging message comprising at least some same data as the first paging message.

In a variant, the method may further include determining, by the user equipment, that the second paging message is not addressed to the user equipment.

According to a second embodiment, a method may include transmitting, by a network entity, at least one indication to a user equipment indicating that the user equipment is allowed to skip paging monitoring after a paging message is successfully decoded. The method may further include transmitting, by the network entity, a first paging message comprising at least one non-access-stratum identity for a plurality of user equipment to the user equipment. The method may further include transmitting, by the network entity, a second paging message to the user equipment comprising at least same data as the first paging message.

In a variant, the at least one indication may be transmitted as part of broadcasted signaling, such as system information.

In a variant, the at least one indication may be transmitted as part of dedicated signaling, including at least one radio resource control message.

In a further variant, the at least one radio resource control message may comprise one or more of at least one radio resource control reconfiguration, radio resource control setup, radio resource control resume, and radio resource control re-establishment.

In a variant, the method may further include transmitting, by the network entity, at least one indication that paging occasion transmitted after transmitting at least one wake-up signal may contain the same paging message.

In a variant, the same paging messages may be identical.

In a variant, the method may further include, after transmitting a wake-up signal, transmitting, by the network entity, at least one indication indicating whether at least one paging occasion may contain paging data for the user equipment after transmitting the first paging message.

In a variant, the method may further include transmitting, by the network entity, at least one indication that paging occasions may contain the same user equipment identities following at least one wake-up signal.

In a variant, the method may further include transmitting, by the network entity, at least one indication indicating the user equipment whether any subsequent paging occasions may contain paging for the user equipment, after transmitting at least one wake-up signal.

In a variant, the method may further include transmitting, by the network entity, at least one indication comprising wake-up signal configuration data to the user equipment.

In a variant, the method may further include transmitting, by the network entity, at least one wake-up signal to the user equipment.

According to a third embodiment and a fourth embodiment, an apparatus can include at least one processor and at least one memory and computer program code. The at least one memory and the computer program code can be configured to, with the at least one processor, cause the apparatus at least to perform a method according to the first embodiment, the second embodiment, and any of their variants.

According to a fifth embodiment and a sixth embodiment, an apparatus may include means for performing the method according to the first embodiment, the second embodiment, and any of their variants.

According to a seventh embodiment and an eighth embodiment, a computer program product may encode instructions for performing a process including a method according to the first embodiment, the second embodiment, and any of their variants.

According to a ninth embodiment and a tenth embodiment, a non-transitory computer-readable medium may encode instructions that, when executed in hardware, perform a process including a method according to the first embodiment, the second embodiment, and any of their variants.

According to an eleventh embodiment and a twelfth embodiment, a computer program code may include instructions for performing a method according to the first embodiment, the second embodiment, and any of their variants.

According to a thirteenth embodiment and a fourteenth embodiment, an apparatus may include circuitry configured to perform a process including a method according to the first embodiment, the second embodiment, and any of their variants.

We claim:

1. An apparatus comprising:
   at least one processor; and
   at least one memory including computer program code;
   the at least one memory and the computer program code configured to, with the at least one processor, cause the apparatus at least to
   receive at least one indication, the at least one indication indicating that the apparatus is allowed to skip paging monitoring on a physical downlink control channel after a paging message on the physical downlink control channel is successfully decoded, wherein the at least one indication received prior to the paging message being received, the at least one indication indicating whether the apparatus is or is not required to continue monitoring for additional paging occasions after receiving a first paging occasion;
   receive at least one indication indicating that at least two paging occasions include same user equipment identities after receiving at least one wake-up signal;
   determine to end paging monitoring based upon received wake-up signaling configuration data; and
   enter discontinuous reception sleep mode.

2. The apparatus of claim 1, wherein the at least one indication is received as part of at least one of broadcast signaling or dedicated signaling.

3. The apparatus of claim 2, wherein the broadcast signaling comprises system information.

4. The apparatus of claim 2, wherein the dedicated signaling comprises at least one radio resource control message, and the at least one radio resource control message comprises one or more radio resource control reconfiguration, radio resource control setup, radio resource control resume, or radio resource control re-establishment.

5. The apparatus of claim 1, wherein the at least one memory and the computer program code configured to, with the at least one processor, cause the apparatus at least to receive at least one indication indicating that at least two paging occasions, received after receiving at least one wake-up signal, comprise same paging messages.

6. The apparatus of claim 1, wherein the at least one memory and the computer program code configured to, with the at least one processor, cause the apparatus at least to, after receiving at least one wake-up signal, receive at least one indication indicating whether at least one paging occasion comprises paging data for the apparatus after receiving a first paging message.

7. The apparatus of claim 6, wherein the paging data comprises user equipment identifier.

8. The apparatus of claim 1, wherein the at least one memory and the computer program code configured to, with the at least one processor, cause the apparatus at least to receive, from a network entity, an indication of a number of paging messages for the apparatus to successfully decode.

9. The apparatus of claim 1, wherein the at least one memory and the computer program code configured to, with the at least one processor, cause the apparatus at least to enter a sleep mode when the paging message does not include a user equipment non-access stratum identity and/or when a number of paging messages successfully received equals an indication of a number of paging messages.

10. The apparatus of claim 1, wherein the at least one memory and the computer program code configured to, with the at least one processor, cause the apparatus at least to receive at least one indication configuring the apparatus to know whether any subsequent paging occasion includes paging for the apparatus, after receiving at least one wake-up signal.

11. The apparatus of claim 1, wherein the apparatus is configured at least one of in an idle mode, in an inactive mode, in a connected mode, or with an extended discontinuous reception functionality.

12. The apparatus of claim 1, wherein the at least one memory and the computer program code configured to, with the at least one processor, cause the apparatus at least to receive at least one indication comprising the wake-up signaling configuration data from a network entity.

13. The apparatus of claim 1, wherein the at least one memory and the computer program code configured to, with the at least one processor, cause the apparatus at least to receive at least one wake-up signal from a network entity.

14. The apparatus of claim 1, wherein the at least one memory and the computer program code configured to, with the at least one processor, cause the apparatus at least to receive a first paging message comprising at least one non-access-stratum identity for a plurality of user equipments.

15. The apparatus of claim 14, wherein the at least one memory and the computer program code configured to, with the at least one processor, cause the apparatus at least to determine the first paging message cannot be decoded.

16. The apparatus of claim 14, wherein the at least one memory and the computer program code configured to, with the at least one processor, cause the apparatus at least to receive a second paging message comprising at least some same data as the first paging message.

17. The apparatus of claim 16, wherein the at least one memory and the computer program code configured to, with the at least one processor, cause the apparatus at least to determine that the second paging message is not addressed to the apparatus.

18. A method, comprising:
receiving, by a user equipment, at least one indication, the at least one indication indicating that the user equipment is allowed to skip paging monitoring on a physical downlink control channel after a paging message on the physical downlink control channel is successfully decoded, wherein the at least one indication received prior to the paging message being received, the at least one indication indicating whether the user equipment is or is not required to continue monitoring for additional paging occasions after receiving a first paging occasion;

receiving, by the user equipment, at least one indication indicating that at least two paging occasions include same user equipment identities after receiving at least one wake-up signal;

determining, by the user equipment, to end paging monitoring based upon received wake-up signaling configuration data; and entering, by the user equipment, discontinuous reception sleep mode.

19. An apparatus comprising:
at least one processor; and at least one memory including computer program code;

the at least one memory and the computer program code configured to, with the at least one processor, cause the apparatus at least to transmit, from the apparatus to a user equipment, at least one indication, the at least one indication indicating that the user equipment is allowed to skip paging monitoring on a physical downlink control channel after a paging message on the physical downlink control channel is successfully decoded, wherein the at least one indication received prior to the paging message being received, the at least one indication indicating whether the user equipment is or is not required to continue monitoring for additional paging occasions after receiving a first paging occasion, wherein the at least one indication includes wake-up signaling configuration data;

transmit, to the user equipment, at least one indication indicating that at least two paging occasions include same user equipment identities after receiving at least one wake-up signal; and transmit, from the apparatus to the user equipment, a first paging message.

* * * * *